United States Patent [19]
Schlagmueller et al.

[11] Patent Number: 5,209,315
[45] Date of Patent: May 11, 1993

[54] ELECTROMOTIVE POWER STEERING

[75] Inventors: Walter Schlagmueller, Schwieberdingen; Helmut Rembold, Stuttgart; Ernst Linder, Muehlacker, all of Fed. Rep. of Germany

[73] Assignee: Robert Bosch GmbH, Stuttgart, Fed. Rep. of Germany

[21] Appl. No.: 684,904
[22] PCT Filed: Sep. 12, 1990
[86] PCT No.: PCT/DE90/00698
§ 371 Date: May 2, 1991
§ 102(e) Date: May 2, 1991
[87] PCT Pub. No.: WO91/05692
PCT Pub. Date: May 2, 1991

[30] Foreign Application Priority Data

Oct. 10, 1989 [DE] Fed. Rep. of Germany ....... 3933711

[51] Int. Cl.[5] .............................................. B62D 5/04
[52] U.S. Cl. ...................... 180/79.1; 192/21; 192/43.1
[58] Field of Search .............. 180/79.1, 146, 149, 180/151; 74/388 PS; 192/43.1, 21

[56] References Cited
U.S. PATENT DOCUMENTS

| 3,319,750 | 5/1967 | Olson | 192/43.1 |
| 4,241,804 | 12/1980 | Deininger et al. | 180/79.1 |
| 4,588,060 | 5/1986 | Norton | 180/79.1 |
| 4,598,787 | 7/1986 | Druchas | 180/79.1 |
| 5,031,714 | 7/1991 | Nishimori et al. | 180/141 |

FOREIGN PATENT DOCUMENTS

| 0051515 | 5/1982 | European Pat. Off. . |
| 0174202 | 3/1986 | European Pat. Off. . |
| 2817190 | 10/1979 | Fed. Rep. of Germany . |
| 3612619 | 11/1986 | Fed. Rep. of Germany . |
| 1583658 | 11/1969 | France . |
| 2223981 | 10/1974 | France . |
| 2442476 | 6/1980 | France . |

Primary Examiner—Margaret A. Focarino
Assistant Examiner—Anne Marie Boehler
Attorney, Agent, or Firm—Edwin E. Greigg; Ronald E. Greigg

[57] ABSTRACT

It is proposed in the case of an electromotive power steering as a steering aid for motor vehicles and similar, particularly for the speed range during parking (parking power steering), having a reduction gear between the servo-motor and the steering column or the drive leading on to the mechanical wheel displacement, that at least one clutch block be so arranged that it creates a drive connection from the servo-motor drive to the steering gear side of the steering column when, upon a moment being exerted manually at the steering wheel, a pawl connected to the steering wheel side of the steering column produces the requisite clutch pressure by mechanical action on the at least one clutch block, while the gear wheels acted upon by the clutch are formed as ring gears fitted to a carrier flange which is joined firmly to the driven section of the steering column so that it cannot rotate.

31 Claims, 4 Drawing Sheets

5,209,315

ELECTROMOTIVE POWER STEERING

STATE OF THE ART

The invention is directed to an electromotive power steering. Power steering for a motor vehicle is known in many forms; the additional power, usually produced electromotively or with the aid of a pressure means, is made proportional to the angle of twist of a torsion bar in the steering column, whereby a power-assisting effect dependent on speed is also a possibility.

Electromotive power steering can for example be used with advantage as a steering aid for motor vehicles and similar, specifically in the range of speeds during parking, i.e. as parking power steering, and is usually not required at higher speeds. Such electromotive power steering is therefore suitable particularly for smaller motor vehicles and passenger cars.

In a known electromotive steering aid (SAE-Paper 851 639) a torsion sensor detects the relative twist of the steering column before the steering gear and correspondingly actuates an electric motor with varying direction of rotation which then for its part supports through a suitable reduction gear the exertion of a moment effected by the driver about the steering column. Such electromotive steering aid is also advantageous because by the appropriate actuation of the electric servo-motor certain properties of the steering aid can be obtained without difficulty, such as for example an amplification of the supplementary power delivered by the servo-motor as the speed of the vehicle is being reduced, whereby other control algorithms can also be determined. Advantages further result in respect of the energy required for the power steering as well as in the sphere of handling properties of the vehicle. If such an electromotive steering aid is used merely as a power steering for parking, it is of course necessary to provide separating means, for example a separating coupling, which uncouple the gearing engaged by the servo-motor from the steering column, in order that steering wheel movements may be made possible at all, or not be braked too strongly, when the servo-motor is not actuated.

If the moment exerted by the driver about the steering column is for example measured by a torsion bar in the steering column, the torsion bar must, when the corresponding electromotive power steering serves merely as an aid to parking, i.e. is actuated only below a speed limit of for instance 5 km/h, be blocked at higher speeds (normal driving) or its torsion effect must be substantially eliminated, since otherwise steering loses in precision during normal driving i.e. it would in a certain sense be too soft. Such blockage of the torsion bar can for example be effected by auxiliary coupling, click-and-pawl arrangements or similar, which is awkward and expensive.

The invention has the basic objective of developing an electromotive power steering specifically as an aid to parking, in such a manner that the exertion of the supplementary force ensues without difficulties in dependence on the moment exerted about the steering column by the driver from time to time, and that an influence on the behaviour of the steering, say in the direction of the steering being too soft, is eliminated when the parking aid is uncoupled or switched off.

ADVANTAGES OF THE INVENTION

The electromotive power steering in accordance with the invention has the advantage that clutch rings constructed as ring gears transfer by respectively selective friction lock the supplementary servo-force exerted by the electric motor to the steering column and from this to the steering gear connected with it, whereby the clutch engagement as well as the respective direction of rotation are determined from the moment exerted by the driver about the steering column by turning the steering wheel. It is at the same time further advantageous that the electric motor exerting the supplementary force may be of any desired construction since its own direction of rotation does not have to be reversed for the two directions of turning of the steering wheel. To that extent the actuation of the electric motor is also not critical; it can for instance be switched on, at the time of turning of the steering wheel, by appropriate contact switches reacting to the turning of the steering wheel, whereby only one common contact switch is required for both directions of turning. The removal of the supplementary force produced by the electric servo-motor then ensues in dependence on the moment exerted, whereby clutch shoes connect the steering column, depending on its direction of rotation and preferably in a self-amplifying manner as to its friction lock, with a first ring gear moving in a given direction of rotation or with a second ring gear moving in the opposite direction, as the case may be.

Advantageous further developments and improvements of the electromotive power steering specified are made possible by the measures set out herein. Particularly advantageous is the possibility of blocking the torsion bar without additional switching elements in a first embodiment in which there is a direct transmission from the steering wheel to the steering gear by the continuous steering column.

Alternatively, it is also possible in a simplified construction not to have a continuous spindle in the form of the steering column for the exertion of the auxiliary servo-force, but to fit the spindles coming from the steering gear and that coming from the steering wheel loosely in each other, whereby the drive engagement of the spindle leading to the steering gear during the exertion of a moment by the driver occurs practically without any play. In this manner, it is achieved that harmful play in the steering is compensated, and possible wear of the clutch blocks is also being taken into account by automatic adjustment.

DRAWING

Several embodiments of the invention are shown in the drawing and are explained in more detail in the subsequent description. The following are shown:

FIG. 1 a section along the line I—I of FIG. 2 through a preferred form of construction of an electromotive steering aid unit, specifically for parking, with a partial representation of the steering column and the reduction gear appertaining to an electric motor, which motor is not shown;

Figure 3:
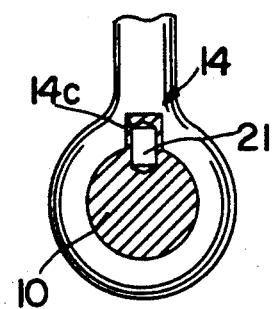
Figures 2A, 2B:
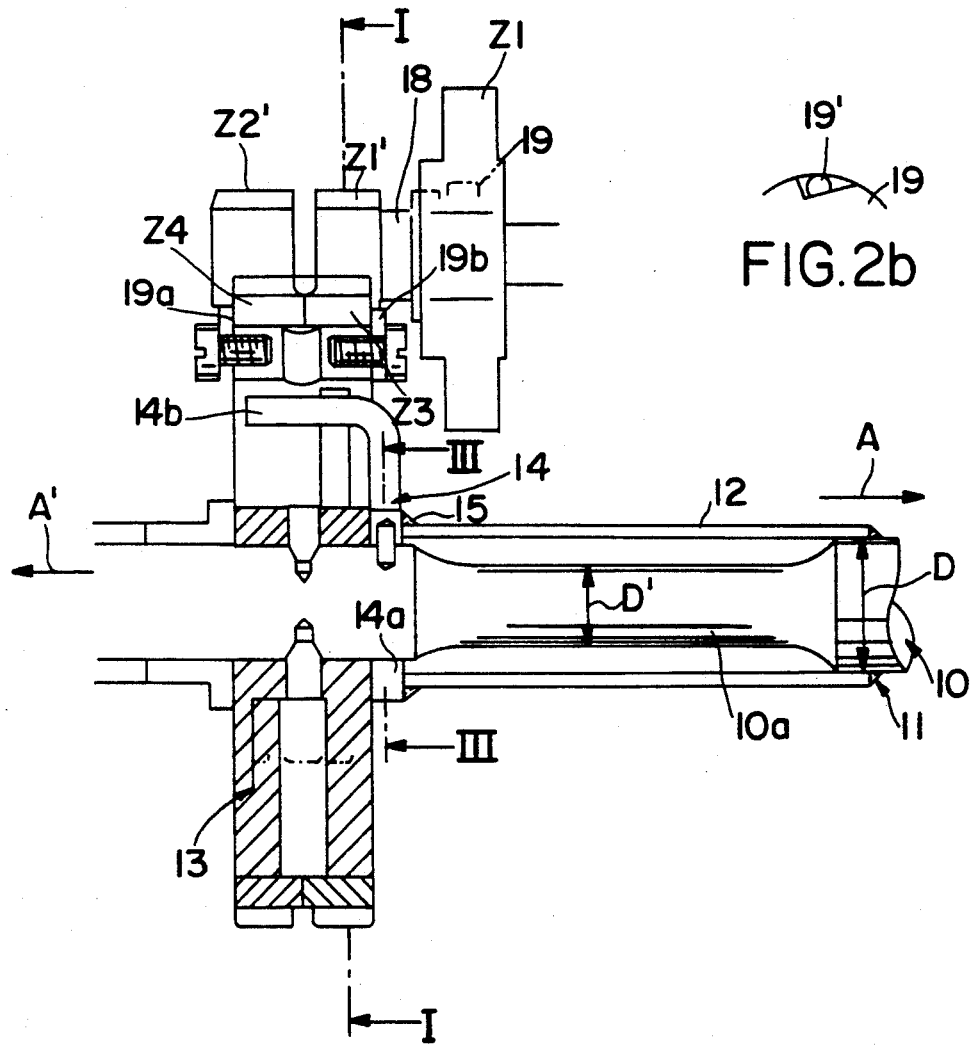
FIG. 2a shows a partial sectional elevation of the electromotive steering aid unit.
FIG. 2b illustrates a free wheel mechanism with a clamping element.
Figure 4:
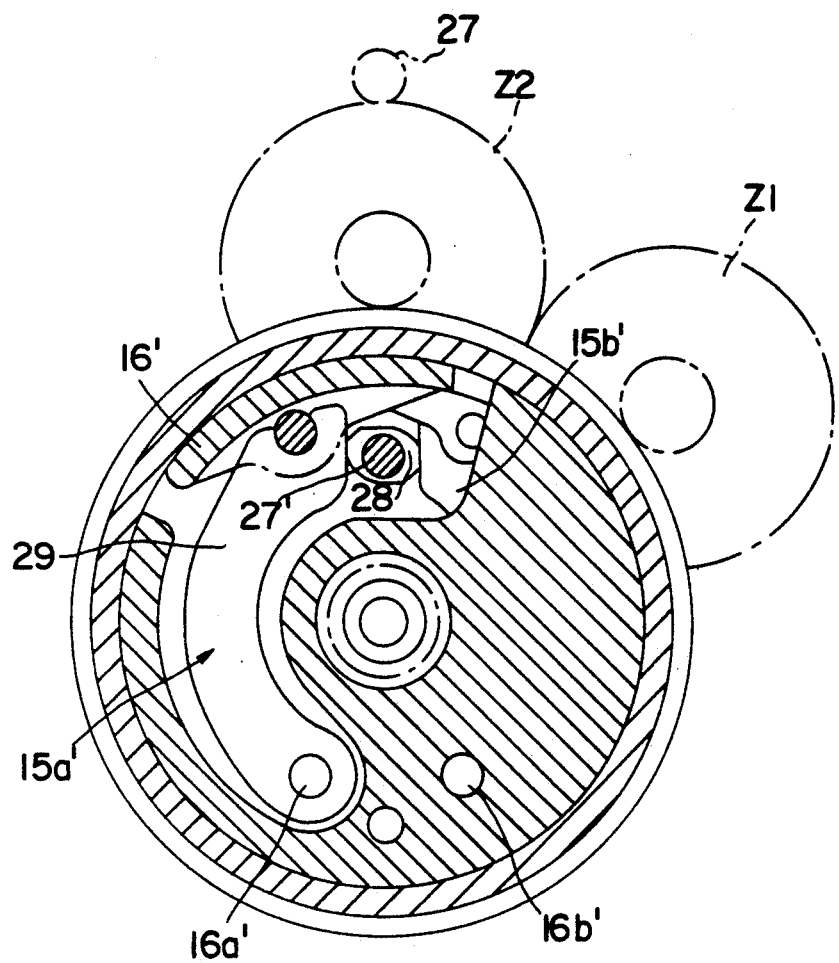
Figure 6:
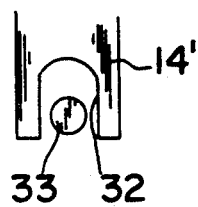
Figure 5:
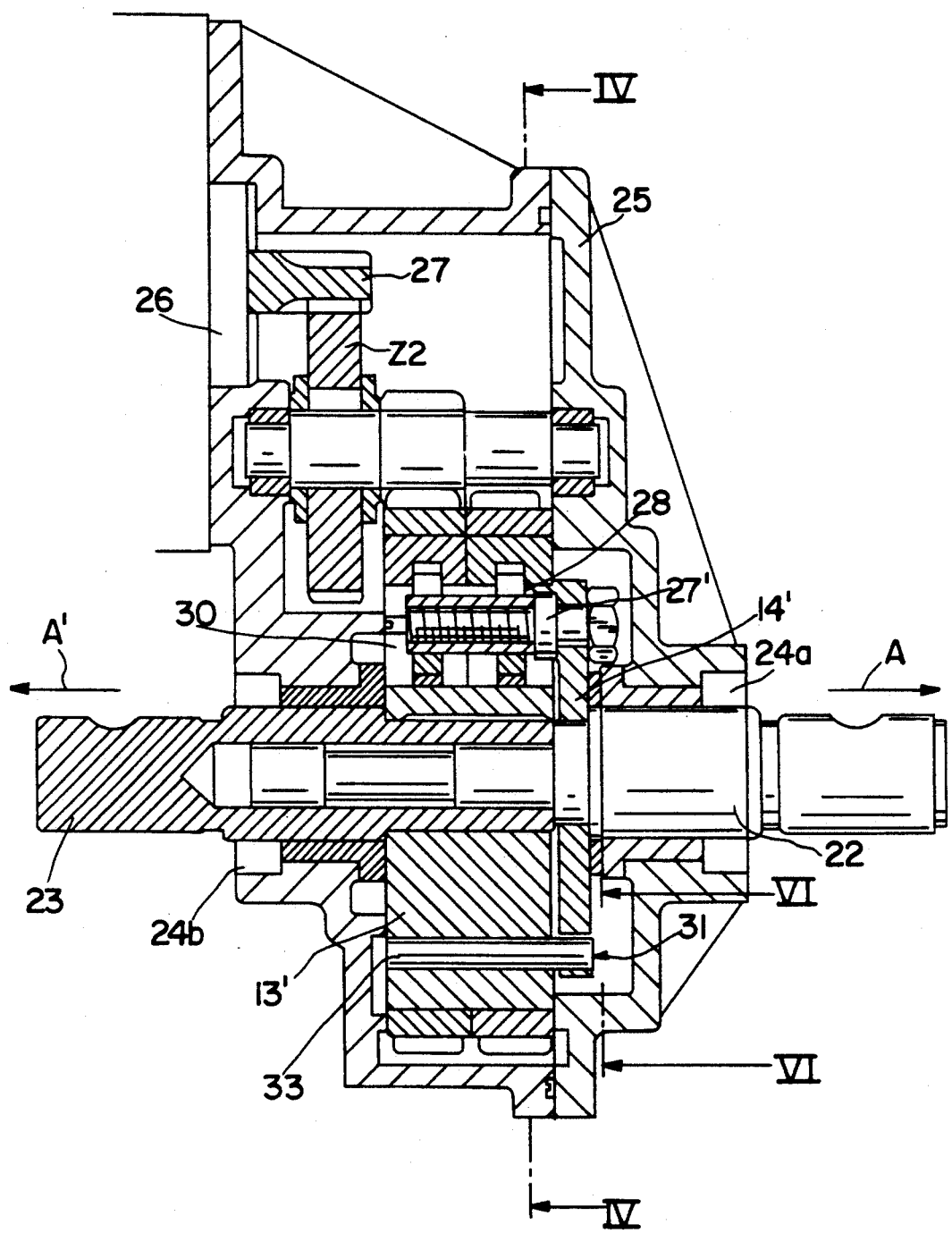

FIG. 3 a detailed representation as a section along the line III—III of FIG. 2;

FIGS. 4 and 5 show a further preferred form of construction of the present invention, likewise in cross and longitudinal section, and FIG. 6 shows schematically a top view of a partial section as at a positive lock.

DESCRIPTION OF THE EMBODIMENTS

The basic concept of the present invention consists in actuating, according to the direction of turning, respectively different clutch blocks by means of a pawl provided on the steering column on the side on which the driver exerts the moment, which clutch blocks are so seated on the part of the steering column, which may so to speak be regarded as a driven spindle, that they cannot rotate and which by friction engagement drive with them the steering column leading on to the steering gear, whereby at the time of the exertion of a moment by the driver about the steering column, by means of a pair of wheels rotating in opposite directions to each other which are jointly driven by a servo-motor, both directions of turning of the steering column are available and it is determined by the pawl which direction of rotation is selected for the exertion of the supplementary force. The pawl can be fitted at the end of a torsion bar or be a solid part of a steering column coming from the steering wheel. Its purpose is the selective application of pressure by the clutch blocks depending on the moment exerted by the driver.

Figure 1:
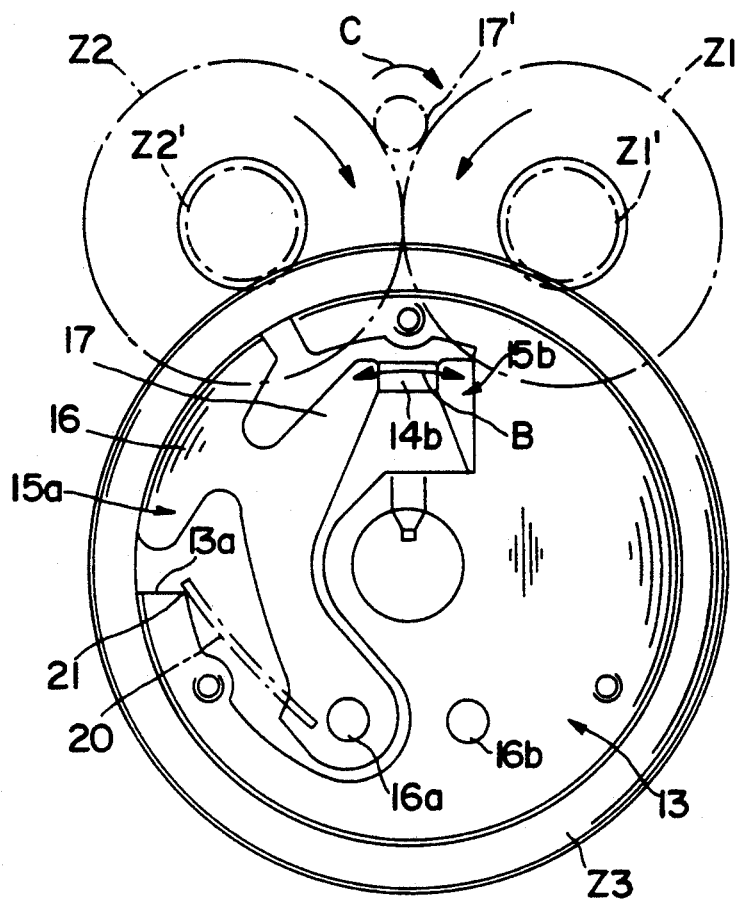

In the embodiment shown in FIGS. 1 and 2, the steering column which in this case effects a direct transmission is denoted by 10; arrow A gives the direction to the steering wheel and arrow A' the direction to the steering gear. In the intervening region, the steering column forms a torsion bar 10a, namely by a material reduction of given thickness, so that in the region of the steering column-torsion bar 10a there results a smaller diameter D' compared to the normal steering column diameter D.

A sleeve 12 is fixed, preferably by welding, at the start of the torsion bar, i.e. at 11, nearly extending to a carrier flange 13 which is fixed in the direction of rotation to the continuing steering column and is located thereon.

At the end of the sleeve 12 a pawl is rotatably fitted at a predetermined angle on the steering column and fixed to the sleeve 12, for example also by means of a welding connection shown at 15.

The pawl 14 can be in the form of a rod fixed to the steering column or a ring 14a encircling the steering column 10 from which extends a ridge-like projection 14b bent from it in the shape of an "L". This projection 14b ranges through an opening into the carrier flange 13 which it traverses. It will be seen that by the exertion of a moment from the steering wheel side, the pawl projection 14b can thus effect a very small rotational displacement relative to the carrier flange 13 in the direction of the double arrow B in FIG. 1.

The carrier flange 13 has rotatably fitted to it at its outer circumference two externally toothed ring gears Z3 and Z4 independent of each other. At the same time the carrier flange 13 has at its outer circumference openings 13a (FIG. 1) through which clutch blocks 15a and 15b can be brought to bear, in a manner axially offset from each other, against the inner diameter of the ring gears Z3 or Z4, respectively. The clutch blocks 15a, 15b are each pivoted at 16a, 16b, conveniently at opposite wall regions of the carrier flange 13; they each have a clutch shoe 16 and a nose-shaped extension 17. They come to bear with the clutch shoe against the inner diameter of the ring gear Z3 or Z4 appertaining in each case, while the nose-shaped extension 17 has the purpose that it comes into operating contact with the pawl 14, or more precisely with the projection 14b bent from it, so that, depending on the relative rotational displacement of the pawl projection 14b, either one or the other clutch shoe 16 of the clutch block 15a or 15b is pressed against the inner diameter of the ring gear Z3 or Z4 when the driver exerts a moment at the steering wheel, while the externally toothed ring gears Z3 or Z4 are held by the carrier flange 13 in a suitable retaining device appertaining to it in such a manner that they can rotate against each other.

Further explanations now follow best from the other side, whereby firstly a pinion 17', connected to the output shaft of an electric motor not shown, is denoted at 17'. On the engagement of the desired parking aid, the electric motor can be actuated in a suitable manner not further to be explained here, whereby a direction of rotation of the output shaft ensues for example in the direction of arrow C. This direction of rotation applies to both directions of turning of the steering wheel and, as previously mentioned, does not have to be changed. The output pinion 17' meshes with the first gear wheel Z1 which for its part meshes with a gear wheel Z2 of equal dimension. The gear wheels Z1 and Z2 are pivoted in a suitable manner in an appropriate stationary housing which in so far as it is convenient also completely encloses the steering aid unit, while they are connected by an extension of the spindle 18 supporting them, through a free-wheel mechanism 19 of suitable construction, to the gear wheels Z1' and Z2'. In the small drawing at the upper right of FIG. 2 a possible form of design of such a free-wheel mechanism is shown; this can be constructed in the usual manner and can have a clamping element 19' for example in the form of a ball which is carried along into the clamping position by means of a bevel when the respective larger gear wheel Z1, Z2 is actuated, whereby there then ensues the rotary drive of the small gear wheels Z1', Z2' arranged concentrically with and axially offset to the large gear wheels Z1, Z2 on the same spindle, which small gear wheels Z1', Z2' then for their part mesh in an axially offset manner with the external teeth of the gear rings Z3 and Z4, and as FIG. 1 shows, additionally also with each other at a predetermined angle.

When therefore the servo-motor is activated, all the gear wheels mentioned rotate driven by the pinion 17', i.e. the gear wheels Z1 and Z2, whereby the gear wheel Z1 is driven directly by the pinion and for its part drives the sister gear wheel Z2. The gear wheels Z1' and Z2' are then driven by the free-wheel mechanism which locks when a moment is exerted by the servo-motor. The gear wheels Z1' and Z2' drive for their part, and consequently also in opposite directions, the ring gears Z3 and Z4. These gear wheels can be held onto the outer circumference of the carrier flange 13 by retaining rings 19a, 19b screwed to the carrier flange 13 or by other suitable means.

There then results the following function. As soon as a corresponding distortion of the steering column in the region of the torsion bar 10a ensues due to the steering wheel being turned—with the simultaneously effected actuation of the electric servo-motor which is not shown—the clutch block appropriate according to the desired direction of turning of the steering wheel is brought by means of its clutch shoe 16 into contact with the inner diameter either of the gear wheel Z3 or of the gear wheel Z4 by the pawl projection 14b, so that in addition to the exerted steering moment there results, as a steering aid, a corresponding additional supplementary servo-moment which is attributable to the friction engagement which is further increased by the corresponding ring gear Z3 or Z4 also being pressed by the reaction force against the carrier flange 13, namely its outer periphery, when the respective clutch block comes into contact.

It can also be an advantageous embodiment of the present invention so to construct the respective brake blocks that they have a shape as shown in FIG. 1 so that there results a lever action about the respective pivot 16a, 16b of the clamping block 15a, 15b which leads to a self-amplification of the force of contact due to the friction moment produced by the engagement of the drive, as can be readily understood from FIG. 1., similar to self-amplification in the case of brake blocks, since a drive force is exerted in a tangential direction on the brake shoe 16 due to the friction engagement with the inner surface of the respective ring rear Z3 or Z4, which force can be resolved into a force acting directly on the pivot 16a and a force which causes the clutch shoe to be pressed still more strongly against the inner surface of the respective ring gear.

To release the respective brake block or to prevent the brake block not engaged by the drive contact from coming into a friction position in relation to the ring gear appertaining to it, each clutch block can have a pre-loaded leaf spring 20 which is braced against a suitable inner protuberance 21 of the carrier flange 13 and pushes the clutch shoe 16 away from the ring gear.

For a satisfactory functioning it is advisable to aim to have as much play as possible of the movable parts; it may therefore be advisable to bring about the driving effect on the clutch blocks in an adjustable manner by means of an eccentric stud, which achieves that the slack in the system is reduced to a necessary minimum. In that case the behaviour of the torsion bar 10a alone is then effective in the transmission of the steering moment.

A further embodiment of the present invention is advisable in the case of the occurrence of an extreme situation which can exist in that a complete or partial motor blockage of the servo-motor takes place due to an excessive steering moment being exerted. Such a situation could occur when the steering is locked and the driver nevertheless presses further, or when a wheel is pressed against a curb. In that case a sliding clutch could for example be provided at the servo-motor which comes into operation when a predetermined turning moment is exceeded, or one limits the possible distortion of the torsion bar by providing a recess 14c within the pawl 14 in which there is a stud 21 firmly connected with the steering column 10, as shown in FIG. 3. The predetermined clearance between the dimension of the stud 21 relative to the recess in which it is seated determines the limit of the turn of the steering column section before the torsion bar 10a relative to that after the torsion bar. Depending on the elasticity of the servo-mechanism (pawl, clutch block etc.) a limit is then determined to the turn of the steering column when the driver exerts a moment, limited by the contact of the stud 21 with the respective side of the recess 14c. From the time of the contact onward, the further transmission of the moment then ensues directly through the steering column.

If on the other hand under certain operating conditions the servo-motor is not actuated, for example at higher speeds, when the electromotive steering aid in accordance with the invention is only used for parking, the free-wheel 19 mechanism releases automatically, and when the steering column is turned, the gear wheels Z3 or Z4 and smaller gear wheels Z1', Z2' meshing with them, rotate freely. It is understood that the entire unit can be accommodated in an encapsulated manner, as is furthermore the case in the subsequently yet to be explained embodiment of FIGS. 4 and 5, while the encapsulating housing can also be provided with an oil filling in order thus to keep the wear of the critical parts (clutch lining, pawl) small, or in effect to prevent it entirely.

The embodiment of FIGS. 4 and 5 corresponds basically to the embodiment described in FIGS. 1 and 2, so that the same parts, or in any case parts having the same function, are denoted by the same reference number merely differentiated by an apostrophe, so that it is also superfluous to repeat the explanation of the basic construction and basic operation which has already been given.

The essence of the embodiment of FIGS. 4 and 5 is that an automatic compensation for play is provided, whereby a torsion bar formed in the axial span of the steering wheel is dispensed with entirely. There is therefore, to express it in a general way, no direct connection between drive and output through the torsion bar, while the two spindles of the steering column which here border onto each other, i.e. the steering column section 22 coming from the side of the steering wheel and the steering column section 23 leading to the steering gear, are loosely fitted in each other.

A housing 25 is provided containing and also sealing off by suitable seals 24a, 24b the individual parts, which contains the electric servo-motor only partially shown here, or in any case a gear 26 connected to it, which with its output shaft 27 drives one of the gear wheels, i.e. in this case the gear wheel Z2. This then meshes with the other gear wheel Z1.

The pawl 14' is firmly connected to the input spindle section 22 and has fitted in the region of the throw of the clutch blocks a stud 27' which has for its part rotatably fitted on it an eccentric sleeve 28. The shape of the clutch blocks 15a', 15b' is slightly different from the shape as shown in FIG. 1; the respective clutch shoe 16' is attached in a hinged or pivoted manner on the arc-shaped lever 29 of the clutch block 15a', for example clipped in. The eccentric sleeve fitted on the stud 27' of the pawl 14' is pre-loaded by a torsion spring 30 which turns it until there is no further slack in the system. As a result of this, when the steering is actuated, the clutch blocks are already in contact with the inner diameter of the corresponding ring gears carried by the carrier flange 13', whereby harmful effects of play in the steering are automatically compensated beforehand. There is at the same time the further advantage that wear of the clutch lining of the clutch shoes is automatically compensated by the self-operating adjustment.

It is convenient to provide the centring sleeve 28 in its outer shape with an eccentric profile such as is made clear in the cross-sectional representation in FIG. 4, whereby in consequence of self-locking, reverse rotation of the eccentric sleeve against the torsion spring under load is prevented by the shape given to the eccentric profile. The pre-loading of the torsion spring 30 should be selected so that no unacceptably high wear of the clutch linings occurs due to pressure load when the servo-motor is running.

Since there is in the case of the embodiment of FIGS. 4 and 5 no direct transmission by the steering column to the steering gear, it is for safety further advisable to provide also a driving mechanism 31 which engages to lock positively in the last resort and which is provided at the lower end of the pawl 14'. The pawl 14' is for this purpose slit, as shown in FIG. 6, in the shape of a fork by a U-shaped recess 32 in which engages a pin 33 fitted firmly in the carrier flange 13'. The positive drive of the spindle section 23 of the steering column leading to the steering gear is possible through this pin in every case.

All the features presented in the description, the subsequent Claims and the drawing can be of the essence of the invention either individually or also in any desired combination with each other.

We claim:

1. An electromotive power steering aid for motor vehicles, for a speed range during parking which comprises a steering column and a servo-motor drive, a reduction gear between said servo-motor drive and the steering column, at least one clutch block (15a, 15b, 15a', 15b') which creates a drive connection from the servo-motor drive to a steering gear side of the steering column (10; 23), a pawl (14, 14'), during manual exertion of a moment at a steering wheel said pawl (14, 14') is connected with the steering column (10; 22) and produces a requisite clutch pressure by a mechanical application on the at least one clutch block, a carrier flange (13, 13') is fitted on a driven side of the steering column (10; 23), said carrier flange has on an outer ring wall rotatably fitted ring gears (Z3, Z4) openings through which the clutch blocks (15a, 15b, 15a', 15b') which are firmly joined to the carrier flange (13, 13') each selectively contacts an inner diameter of the ring gears (Z3, Z4) by means of clutch shoes (16, 16') to bring about a friction lock, in dependence on the direction of application of the pawl (14, 14'), the steering column (10) forms over a partial section of its length a torsion bar (10a) which is fitted at one end by means of a rigid sleeve (12) and the pawl (14) which extends to the carrier flange (13) and which, depending on the direction of the moment exerted by the driver, engages within the carrier flange by means of a driving projection (14b) one of two clutch blocks (15a, 15b) which upon an actuation of the servo-motor drive resulting simultaneously with the exertion of the moment, come into operating engagement with one of the ring gears (Z3, Z4) which rotate continuously in opposite directions and are offset axially from each other.

2. An electromotive power steering in accordance with claim 1, in which the pawl (14) is constructed adjustably by means of an eccentric stud for the purpose of eliminating slack of any moving parts.

3. An electromotive power steering in accordance with claim 1, in which the steering column comprises two spindle sections (22, 23) engaging in each other and capable of being rotated relative to each other, whereby the pawl (14') is fixed to a steering wheel side section (22) of the steering column so that it cannot rotate and has rotatably fitted on it an eccentric sleeve which comes into operating engagement with the respective operating surface facing it of the two clutch blocks (15a', 15b'), depending on the direction of the exerted moment, and in that the rotatable eccentric sleeve (28) is pre-loaded by a torsion spring in such a manner that freedom from play in the system results.

4. An electromotive power steering in accordance with claim 3, in which the pawl (14') has fitted to it a carrier stud (27) on which the eccentric sleeve is arranged so that it can rotate, and in that the eccentric sleeve has such a shape as to its eccentric profile that self-locking takes place and a reverse rotation of the eccentric sleeve against the action of the torsion spring (30) under load is avoided.

5. An electromotive power steering in accordance with claim 4, in which the pre-loading force of the torsion spring (30) is of such magnitude that wear of clutch linings due to the pressure force exerted by it through the eccentric sleeve is avoided.

6. An electromotive power steering in accordance with claim 1, in which for the purpose of effecting a positive connection of a drive section of the steering column with a driven section of the steering column (22, 23) the pawl (14') has a U-shaped recess (32) which contains a pin (33) with a predetermined clearance fixed firmly to the driven section (23) of the steering column.

7. An electromotive power steering in accordance with claim 1, in which a housing (25) is provided surrounding components of the steering aid so that it encapsulates and seals them, and containing an oil filling.

8. An electromotive power steering in accordance with claim 1, in which a housing (25) is provided surrounding components of the steering aid so that the housing encapsulates and seals them, and containing an oil filling.

9. An electromotive power steering in accordance with claim 1, in which a housing (25) is provided surrounding components of the steering aid so that the housing encapsulates and seals them, and containing an oil filling.

10. An electromotive power steering in accordance with claim 1, in which for a purpose of limiting a torsion bar distortion a recess (14c) is provided on the pawl and contains with a clearance, a stud (21) fixed firmly to the steering column (10).

11. An electromotive power steering aid for motor vehicles, for a speed range during parking which comprises a steering column and a servo-motor drive, a reduction gear between said servo-motor drive and the steering column, at least one clutch block (15a, 15b, 15a', 15b') which creates a drive connection from the servo-motor drive to a steering gear side of the steering column (10; 23), a pawl (14, 14'), during manual exertion of a moment at a steering wheel said pawl (14, 14') is connected with the steering column (10; 22) and produces a requisite clutch pressure by a mechanical application on the at least one clutch block, said pawl (14) is constructed adjustably by means of an eccentric stud for the purpose of eliminating slack of any moving parts, a carrier flange (13, 13') is fitted on a driven side of the steering column (10; 23), said carrier flange has on an outer ring wall rotatably fitted ring gears (Z3, Z4) openings through which the clutch blocks (15a, 15b, 15a', 15b') which are firmly joined to the carrier flange (13, 13') each selectively contacts an inner diameter of the ring gears (Z3, Z4) by means of clutch shoes (16, 16') to bring about a friction lock, in dependence on the direction of application of the pawl (14, 14').

12. An electromotive power steering in accordance with claim 11, in which the steering column comprises two spindle sections (22, 23) engaging in each other and capable of being rotated relative to each other, whereby the pawl (14') is fixed to a steering wheel side section (22) of the steering column so that it cannot rotate and has rotatably fitted on it an eccentric sleeve which comes into operating engagement with the respective operating surface facing it of the two clutch blocks (15a', 15b'), depending on the direction of the exerted moment, and in that the rotatable eccentric sleeve (28) is pre-loaded by a torsion spring in such a manner that freedom from play in the system results.

13. An electromotive power steering in accordance with claim 12, in which the pawl (14') has fitted to it a carrier stud (27) on which the eccentric sleeve is arranged so that it can rotate, and in that the eccentric sleeve has such a shape as to its eccentric profile that self-locking takes place and a reverse rotation of the eccentric sleeve against the action of the torsion spring (30) under load is avoided.

14. An electromotive power steering in accordance with claim 13, in which the pre-loading force of the torsion spring (30) is of such magnitude that wear of clutch linings due to the pressure force exerted by it through the eccentric sleeve is avoided.

15. An electromotive power steering in accordance with claim 11, in which for a purpose of limiting a torsion bar distortion a recess (14c) is provided on the pawl and contains with a clearance, a stud (21) fixed firmly to the steering column (10).

16. An electromotive power steering aid for motor vehicles, for a speed range during parking which comprises a steering column and a servo-motor drive, a reduction gear between said servo-motor drive and the steering column, at least one clutch block (15a, 15b, 15a', 15b') which creates a drive connection from the servo-motor drive to a steering gear side of the steering column (10; 23), a pawl (14, 14'), during manual exertion of a moment at a steering wheel said pawl (14, 14') is connected with the steering column (10; 22) and produces a requisite clutch pressure by a mechanical application on the at least one clutch block, a carrier flange (13, 13') is fitted on a driven side of the steering column (10; 23), so that it cannot rotate, said carrier flange has on an outer ring wall rotatably fitted ring gears (Z3, Z4), openings through which the clutch blocks (15a, 15b, 15a' 15b') which are firmly joined to the carrier flange (13, 13') each selectively contacts an inner diameter of the ring gears (Z3, Z4) by means of clutch shoes (16, 16') to bring about a friction lock, in dependence on the direction of application of the pawl (14, 14'), said steering column comprises two spindle sections (22, 23) engaging in each other and capable of being rotated relative to each other, whereby the pawl (14') is fixed to the steering wheel side spindle section (22) of the steering column so that it cannot rotate and has rotatably fitted on it an eccentric sleeve which comes into operating engagement with the respective operating surface facing it of the two clutch blocks (15a', 15b'), depending on the direction of the exerted moment, and in that the rotatable eccentric sleeve (28) is pre-loaded by a torsion spring in such a manner that freedom from play in the system results.

17. An electromotive power steering in accordance with claim 16, in which for the purpose of effecting a positive connection of a drive spindle section of the steering column with a driven spindle section of the steering column (22, 23) the pawl (14') has a U-shaped recess (32) which contains a pin (33) with a predetermined clearance fixed firmly to the driven spindle section (23) of the steering column.

18. An electromotive power steering in accordance with claim 16, in which a housing (25) is provided surrounding components of the steering aid so that it encapsulates and seals them, and containing an oil filling.

19. An electromotive power steering aid for motor vehicles, for a speed range during parking which comprises a steering column and a servo-motor drive, a reduction gear between said servo-motor drive and the steering column, at least one clutch block (15a, 15b, 15a', 15b') which creates a drive connection from the servo-motor drive to a steering gear side of the steering column (10; 23), a pawl (14, 14'), during manual exertion of a moment at a steering wheel said pawl (14, 14') is connected with the steering column (10; 22) and produces a requisite clutch pressure by a mechanical application on the at least one clutch block, a carrier flange (13, 13') is fitted on a driven side of the steering column (10; 23), so that it cannot rotate, said carrier flange has on an outer ring wall rotatably fitted ring gears (Z3, Z4), openings through which the clutch blocks (15a, 15b, 15a' 15b') which are firmly joined to the carrier flange (13, 13') each selectively contacts an inner diameter of the ring gears (Z3, Z4) by means of clutch shoes (16, 16') to bring about a friction lock, in dependence on the direction of application of the pawl (14, 14'), and for a purpose of effecting a positive connection of a drive section of the steering column with a driven section of the steering column (22, 23), the pawl (14') has a U-shaped recess (32) which contains a pin (33) with a predetermined clearance fixed firmly to the driven section (23) of the steering column.

20. An electromotive power steering in accordance with claim 19, in which the pawl (14') has fitted to it a carrier stud (27) on which the eccentric sleeve is arranged so that it can rotate, and in that the eccentric sleeve has such a shape as to its eccentric profile that self-locking takes place and a reverse rotation of the eccentric sleeve against the action of a torsion spring (30) under load is avoided.

21. An electromotive power steering in accordance with claim 20, in which the pre-loading force of the torsion spring (30) is of such magnitude that wear of clutch linings due to the pressure force exerted by it through the eccentric sleeve is avoided.

22. An electromotive power steering in accordance with claim 21, in which for the purpose of effecting a positive connection of the drive section of the steering column with the driven section of the steering column (22, 23) the pawl (14') has a U-shaped recess (32) which contains a pin (33) with a predetermined clearance fixed firmly to the driven section (23) of the steering column.

23. An electromotive power steering in accordance with claim 21, in which for a purpose of limiting a torsion bar distortion a recess (14c) is provided on the pawl and contains with a clearance, a stud (21) fixed firmly to the steering column (10).

24. An electromotive power steering in accordance with claim 20, in which for the purpose of effecting a positive connection of the drive section of the steering column with the driven section of the steering column (22, 23) the pawl (14') has a U-shaped recess (32) which contains a pin (33) with a predetermined clearance fixed firmly to the driven section (23) of the steering column.

25. An electromotive power steering in accordance with claim 20, in which for a purpose of limiting a torsion bar distortion a recess (14c) is provided on the pawl and contains with a clearance, a stud (21) fixed firmly to the steering column (10).

26. An electromotive power steering in accordance with claim 19, in which for the purpose of effecting a positive connection of the drive section of the steering column with the driven section of the steering column (22, 23) the pawl (14') has a U-shaped recess (32) which contains a pin (33) with a predetermined clearance fixed firmly to the driven section (23) of the steering column.

27. An electromotive power steering in accordance with claim 19, in which a housing (25) is provided surrounding components of the steering aid so that it encapsulates and seals them, and containing an oil filling.

28. An electromotive power steering in accordance with claim 19, in which for a purpose of limiting a torsion bar distortion a recess (14c) is provided on the pawl and contains with a clearance, a stud (21) fixed firmly to the steering column (10).

29. An electromotive power steering aid for motor vehicles, for a speed range during parking which comprises a steering column and a servo-motor drive, a reduction gear between said servo-motor drive and the steering column, at least one clutch block (15a, 15b, 15a', 15b') which creates a drive connection from the servo-motor drive to a steering gear side of the steering column (10; 23), a pawl (14, 14'), during manual exertion of a moment at a steering wheel said pawl (14, 14') is connected with the steering column (10; 22) and produces a requisite clutch pressure by a mechanical application on the at least one clutch block, a carrier flange (13, 13') is fitted on a driven side of the steering column (10; 23), so that it cannot rotate, said carrier flange has on an outer ring wall rotatably fitted ring gears (Z3, Z4), openings through which the clutch blocks (15a, 15b, 15a' 15b') which are firmly joined to the carrier flange (13, 13') each selectively contacts an inner diameter of the ring gears (Z3, Z4) by means of clutch shoes (16, 16') to bring about a friction lock, in dependence on the direction of application of the pawl (14, 14'), and a housing (25) is provided surrounding the components of the steering aid so that it encapsulates and seals the components and contains an oil filling.

30. An electromotive power steering in accordance with claim 29, in which for a purpose of limiting a torsion bar distortion a recess (14c) is provided on the pawl and contains with a clearance, a stud (21) fixed firmly to the steering column (10).

31. An electromotive power steering aid for motor vehicles, for a speed range during parking which comprises a steering column and a servo-motor drive, a reduction gear between said servo-motor drive and the steering column, at least one clutch block (15a, 15b, 15a', 15b') which creates a drive connection from the servo-motor drive to a steering gear side of the steering column (10; 23), a pawl (14, 14'), during manual exertion of a moment at a steering wheel said pawl (14, 14') is connected with the steering column (10; 22) and produces a requisite clutch pressure by a mechanical application on the at least one clutch block, a carrier flange (13, 13') is fitted on a driven side of the steering column (10; 23), so that it cannot rotate, said carrier flange has on an outer ring wall rotatably fitted ring gears (Z3, Z4), openings through which the clutch blocks (15a, 15b, 15a' 15b') which are firmly joined to the carrier flange (13, 13') each selectively contacts an inner diameter of the ring gears (Z3, Z4) by means of clutch shoes (16, 16') to bring about a friction lock, in dependence on the direction of application of the pawl (14, 14'), and for a purpose of limiting a torsion bar distortion, a recess (14c) is provided on the pawl and contains with a clearance, a stud (21) fixed firmly to the steering column (10).

* * * * *